United States Patent
Demandolx et al.

(10) Patent No.: US 7,656,412 B2
(45) Date of Patent: Feb. 2, 2010

(54) TEXTURE RESAMPLING WITH A PROCESSOR

(75) Inventors: Denis Demandolx, Redmond, WA (US); Steven White, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 11/316,093

(22) Filed: Dec. 21, 2005

(65) Prior Publication Data

US 2007/0139431 A1 Jun. 21, 2007

(51) Int. Cl.
*G09G 5/00* (2006.01)

(52) U.S. Cl. .................. 345/582; 345/581; 712/21; 712/215; 712/221

(58) Field of Classification Search .......... 345/582, 345/581
See application file for complete search history.

(56) References Cited

U.S. PATENT DOCUMENTS

| | | | | |
|---|---|---|---|---|
| 5,638,068 A | * | 6/1997 | Nickerson | 341/67 |
| 6,188,800 B1 | * | 2/2001 | Okitsu | 382/276 |
| 6,664,958 B1 | * | 12/2003 | Leather et al. | 345/422 |
| 6,760,037 B2 | * | 7/2004 | Kallay et al. | 345/619 |
| 6,906,715 B1 | * | 6/2005 | Dunn | 345/421 |
| 2004/0012597 A1 | * | 1/2004 | Zatz et al. | 345/501 |
| 2004/0189677 A1 | * | 9/2004 | Amann et al. | 345/660 |
| 2005/0243087 A1 | * | 11/2005 | Aharon | 345/420 |
| 2005/0243094 A1 | * | 11/2005 | Patel et al. | 345/506 |
| 2006/0152509 A1 | * | 7/2006 | Heirich | 345/426 |

FOREIGN PATENT DOCUMENTS

EP            1503345 A1 *  2/2005

* cited by examiner

*Primary Examiner*—M Good Johnson
(74) *Attorney, Agent, or Firm*—Shook, Hardy & Bacon LLP

(57) ABSTRACT

A system, a method and computer-readable media for performing texture resampling algorithms on a processing device. A texture resampling algorithm is selected. This algorithm is decomposed into multiple one-dimensional transformations. Instructions for performing each of the one-dimensional transformations are communicated to a processing device, such as a GPU. The processing device may generate an output image by separately executing the instructions associated with each of the one-dimensional transformations.

17 Claims, 7 Drawing Sheets

TEXTURE RESAMPLING WITH A PROCESSOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Computer software applications today provide a wide variety of controls for allowing users to interact with and manipulate content presented on a computer. For example, the recent growth in the popularity of digital photography can be attributed, in part, to the development of user-friendly applications and operating systems, which facilitate interaction with digital images. These applications and operating systems often make it easy for users to store, organize and share their digital photos.

With the proliferation of interest in digital images, many applications and operating systems today also include tools for editing and manipulating digital images. For example, the user may alter the colors of an image by adding brightness to the presented colors. As another example, the user may resize, rotate or apply a geometric transformation to an image. For manipulations such as these, a texture resampling algorithm must be employed.

As known to those skilled in the art, texture resampling algorithms use a portion of the original image (known as a resampling window) to generate the transformed image. A variety of texture resampling algorithms exist in the art, and the existing algorithms vary in the degree of complexity and in the size of the utilized resampling window. For example, the nearest neighbor method is a texture resampling algorithm that generates an output pixel by simply mapping the output pixel's location onto the input image and copying the pixel nearest to that location. While this algorithm is simple and may be performed quickly, it often produces unacceptable results. Multiple algorithms known in the art provide better quality, but they involve more complex and slower computations. For example, bilinear interpolation algorithms are well-known to provide intermediate quality with intermediate performance. Algorithms such as bicubic, b-spline bicubic and Lanczos-sinc provide high quality results, but they require complex, time-consuming operations, as well as large resampling windows.

To more quickly and efficiently handle operations related to digital images, many computers today include a graphics processing unit (GPU). A GPU is a dedicated graphics processor with a platform that allows for image processing at speeds much faster than traditional central processing units (CPUs). GPUs often include simple, built-in resampling algorithms such as nearest neighbor or bilinear interpolation. However, existing GPUs do not support high-end texture resampling algorithms. Such algorithms are not built-in to the GPUs. Further, while modern GPUs have programmable components that allow implementation of algorithms designed specifically for the GPU, these components can only handle a limited number of instructions and a limited number of sample points. Given these limitations, modern GPUs are incapable of performing complex texture resampling algorithms. Accordingly, these complex algorithms must be performed at slow speeds by CPUs.

SUMMARY

The present invention meets the above needs and overcomes one or more deficiencies in the prior art by providing systems and methods for performing texture resampling algorithms on a processing device. A texture resampling algorithm is selected. This algorithm is decomposed into multiple one-dimensional transformations. Instructions for performing each of the one-dimensional transformations are communicated to a processing device, such as a GPU. The processing device may generate an output image by separately executing the instructions associated with each of the one-dimensional transformations.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for transforming the visual appearance of a digital image. An exemplary operating environment for the present invention is described below.

Figure 1A:
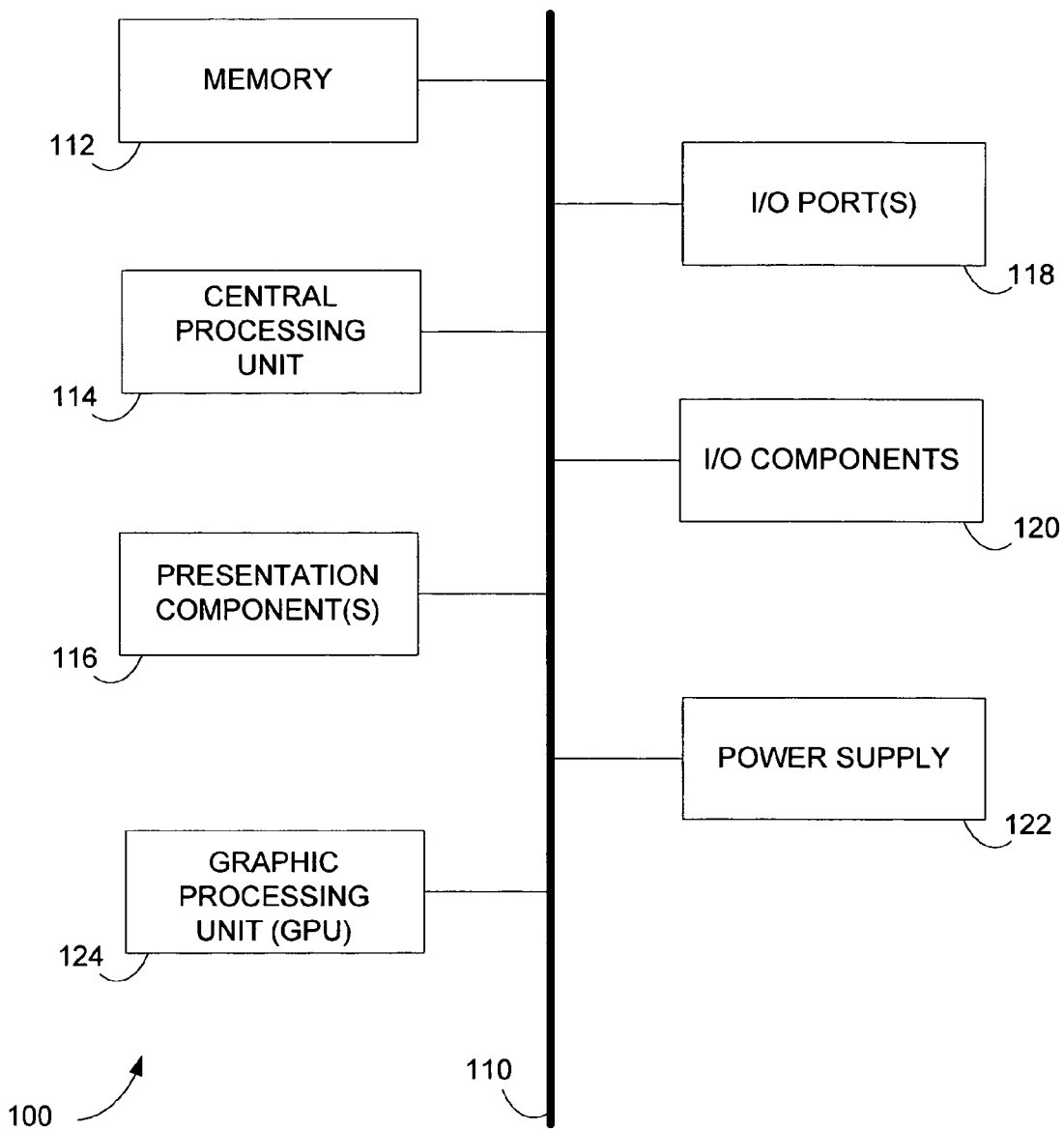
FIGS. 1A and 1B are block diagrams of an exemplary computing system environment suitable for use in implementing the present invention.

Referring initially to FIG. 1A in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, specialty computing devices, etc. The invention may also be practiced in distributed computing environments where tasks are performed by remote-processing devices that are linked through a communications network.

With reference to FIG. 1A, computing device 100 includes a bus 110 that directly or indirectly couples the following components: memory 112, a central processing unit (CPU) 114, one or more presentation components 116, input/output ports 118, input/output components 120, an illustrative power supply 122 and a graphics processing unit (GPU) 124. Bus 110 represents what may be one or more busses (such as an address bus, data bus, or combination thereof). Although the various blocks of FIG. 1A are shown with lines for the sake of clarity, in reality, delineating various components is not so clear, and metaphorically, the lines would more accurately be gray and fuzzy. For example, one may consider a presentation component such as a display device to be an I/O component. Also, CPUs and GPUs have memory. The diagram of FIG. 1A is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1A and reference to "computing device."

Computing device 100 typically includes a variety of physical computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other physical medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 1B:
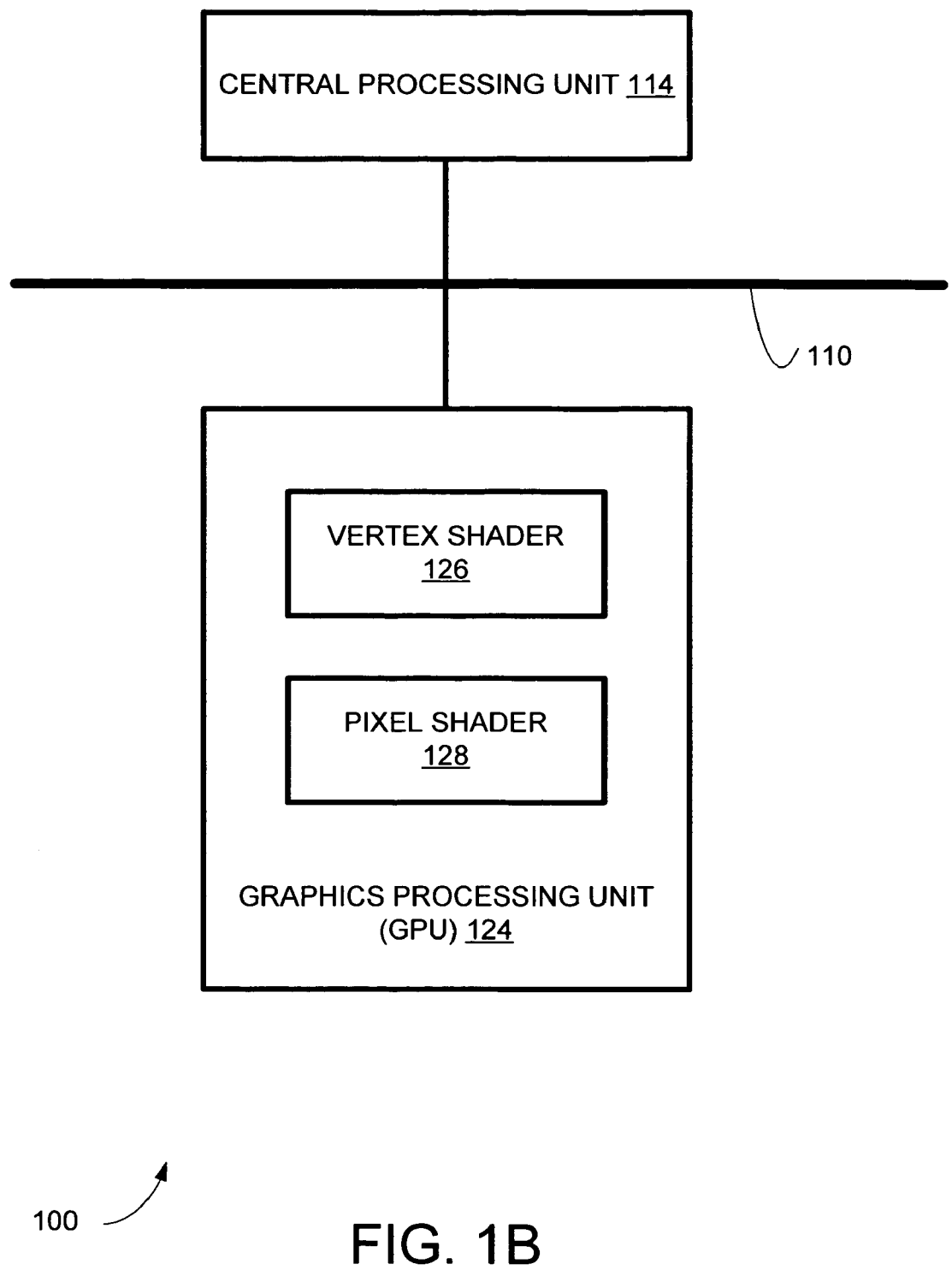

FIG. 1B further details components of the computing device 100 that are used to implement an exemplary graphics pipeline. As known to those skilled in the art, a graphics pipeline relates to a series of operations that are performed on a digital image. These graphics pipelines are generally designed to allow efficient processing of a digital image, while taking advantage of available hardware. In an exemplary scenario, after instructions are processed and some initial computations occur in the CPU 114, a set of coordinate points or vertices that define the image to be rendered are stored in the graphics pipeline for further processing by the GPU 124. Currently, in most graphics pipelines, the data may then be operated upon by one or more procedural shaders, depending upon the instructions that are delivered to the GPU 124. Procedural shaders are specialized processing subunits of the GPU for performing specialized operations on graphics data. An example of a procedural shader is a vertex shader 126, which generally operates on vertices. For instance, the vertex shader 126 can apply computations of positions, colors and texturing coordinates to individual vertices. The vertex shader 126 may perform either fixed or programmable function computations on streams of vertices specified in the memory of the graphics pipeline. Another example of a procedural shader is a pixel shader 128. For instance, the outputs of the vertex shader 126 can be passed to the pixel shader 128, which in turn operates on each individual pixel.

To implement the graphics pipeline, the CPU 114 facilitates the making of calls by applications and services to graphics application-program interfaces (APIs). Conventionally, the applications and drivers are located on the CPU 114. First, the information is sent from the CPU 114 to the GPU 124, as packaged by the CPU 114 according to the APIs. Then, the information waits in memory until it is accessed by the vertex shader 126. After the vertex shader 126 concludes its operations, the information is output through a data path to the pixel shader 128. After the pixel shader 128 has performed its operations, the information is placed in a buffer or is sent back to the host for further operation.

With respect to the pixel shader 128, specialized pixel shading functionality can be achieved by downloading instructions to the pixel shader 128. For instance, downloaded instructions may enable a linear interpolation mechanism. Furthermore, the functionality of many different operations may be provided by instruction sets tailored to the pixel shader 128. For example, negating, remapping, biasing, and other functionality are extremely useful for many graphics applications. In short, the ability to program the pixel shader 128 is advantageous for graphics operations, and specialized sets of instructions may add value by easing development and improving performance. By executing these instructions, a variety of functions can be performed by the pixel shader 128, assuming the instruction count limit and other hardware limitations of the pixel shader 128 are not exceeded. As previously mentioned, components of the GPU 124, such as the pixel shader 128, can handle only a limited number of instructions and a limited number of sample points.

Figure 2:
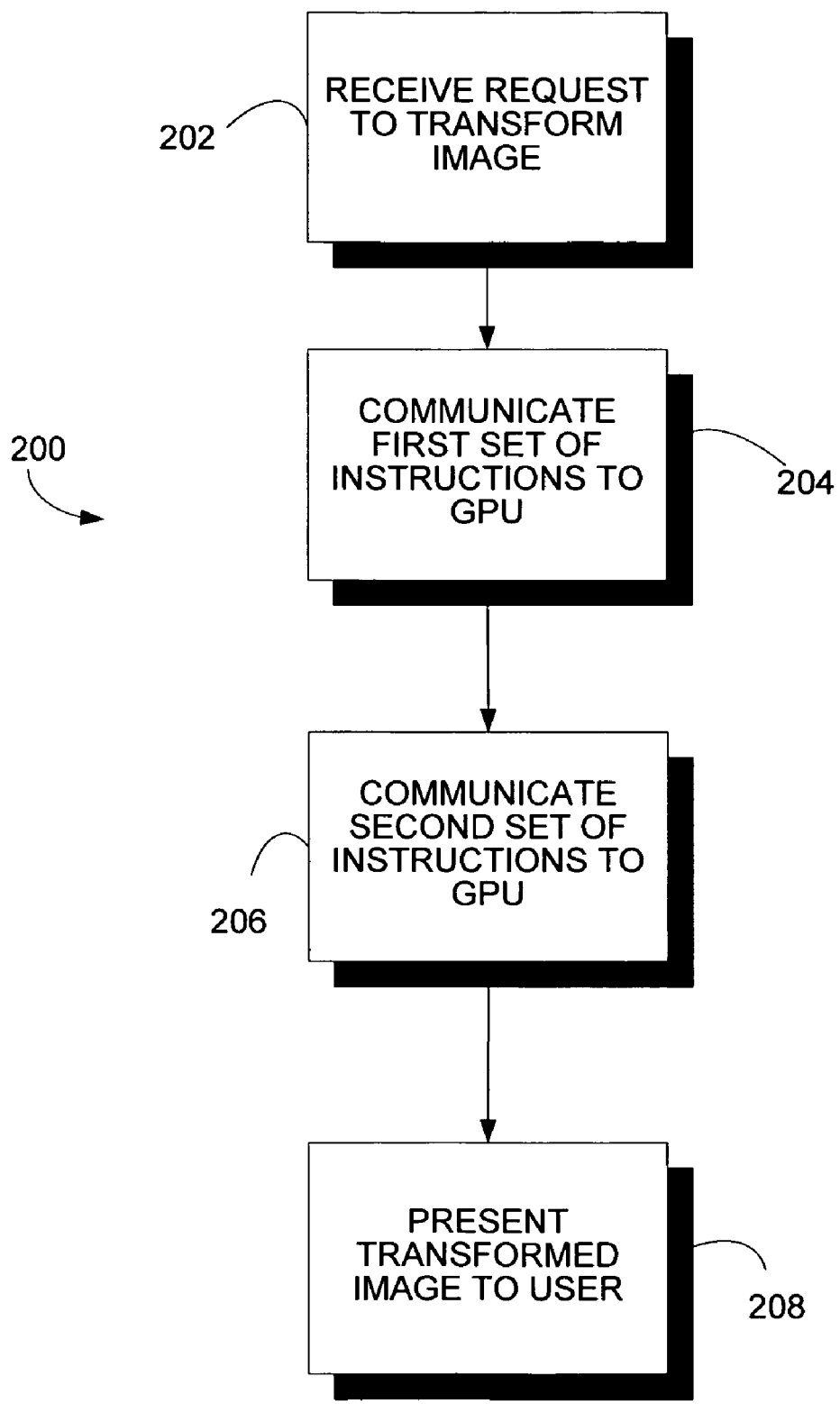
FIG. 2 illustrates a method in accordance with one embodiment of the present invention for altering the visual appearance of a digital image.

FIG. 2 illustrates a method 200 for changing the visual appearance of a digital image. At 202, the method 200 receives a request to transform the appearance of a digital image. For example, a user interface may provide a variety of editing controls for allowing a user to manipulate an image. The user, for example, may request that the image be resized, rotated or skewed. The request to transform the image may also originate from other image processing operations residing on the computer. Those skilled in the art will appreciate that the request to transform the digital image may be received from a variety of sources and may seek a variety of image transformations.

At 204, the method 200 identifies a complex texture resampling algorithm to be performed with respect to a digital image. As will be appreciated by those skilled in the art, a variety of complex resampling algorithms exist in the art, and numerous algorithms may be acceptable for altering a digital image. Such complex resampling algorithms provide high quality results but require many instructions and sample points.

At 206, the method 200 represents the identified algorithm with multiple sets of instructions. For example, the method 200 may decompose the texture resampling algorithm into two or more one-dimensional transformations. Techniques for decomposing texture resampling algorithms are known in the art. To decompose an algorithm, it is generally divided into two or more one-dimensional transformations. By performing each of the transformations in separate passes, the completed algorithm may be achieved. For two-dimensional (2-D) images, this technique is known in the art as two-pass decomposition. For example, a first pass may transform an image in a horizontal direction, while a second pass may transform the image in a vertical direction. As will be appreciated by those skilled in the art, decomposing the resampling algorithm into one-dimensional transformations greatly simplifies the algorithm. For example, the two elementary transformations each deal with only one scanline—the 2D resampling problem is decomposed into two mono-dimensional resamplings. If the original resampling algorithm required 100 (10 by 10) sampling points to interpolate, the one-dimensional transformations will each only require 10 sampling points.

At 208, the method 200 communicates a first set of instructions to a GPU. For example, the instructions may be downloaded to a pixel shader. As previously discussed, a pixel shader may receive and execute a set of instructions with respect to a digital image. The pixel shader may then generate an output image, pixel-by-pixel, in accordance with the instructions.

In one embodiment, the first set of instructions may enable the pixel shader of a GPU to perform a one-dimensional transformation, i.e., the first pass of a decomposed texture resampling algorithm. While the complete algorithm may require too many sampling points and/or instructions to be performed in a single pass on a GPU, the first set of instructions will require only a fraction of these sample points and instructions. Thus, the first set of instructions may be performed by the pixel shader of a GPU. The results of this performance may be stored as an output image in a temporary texture buffer or be communicated to another program or memory location.

To complete the second pass of the decomposed algorithm, at 210, the method 200 communicates a second set of instruction to the GPU. This second set of instructions may enable the GPU to perform a second one-dimensional transformation with respect to the output image from the first pass. For example, if the first set of instructions enabled transformation in the X direction, then the second set of instructions may enable transformation in the Y direction. For a two-dimensional image, the second pass may complete the desired resampling, while a three dimensional image may still require a third pass. It should be noted that, while the method 200 recites communicating the sets of instructions as separate steps, in some embodiments both sets of instructions are communicated to the GPU at the same time. For example, each set of instructions may be communicated to the GPU before execution of either set of instructions.

At 212, the method 200 presents the transformed image to the user. Any number of presentation techniques may be utilized to display the output image. As this output is the result of a complex texture resampling algorithm performed by a GPU, the method 200 may quickly deliver high-quality resampling outputs to the user.

Figure 3A:
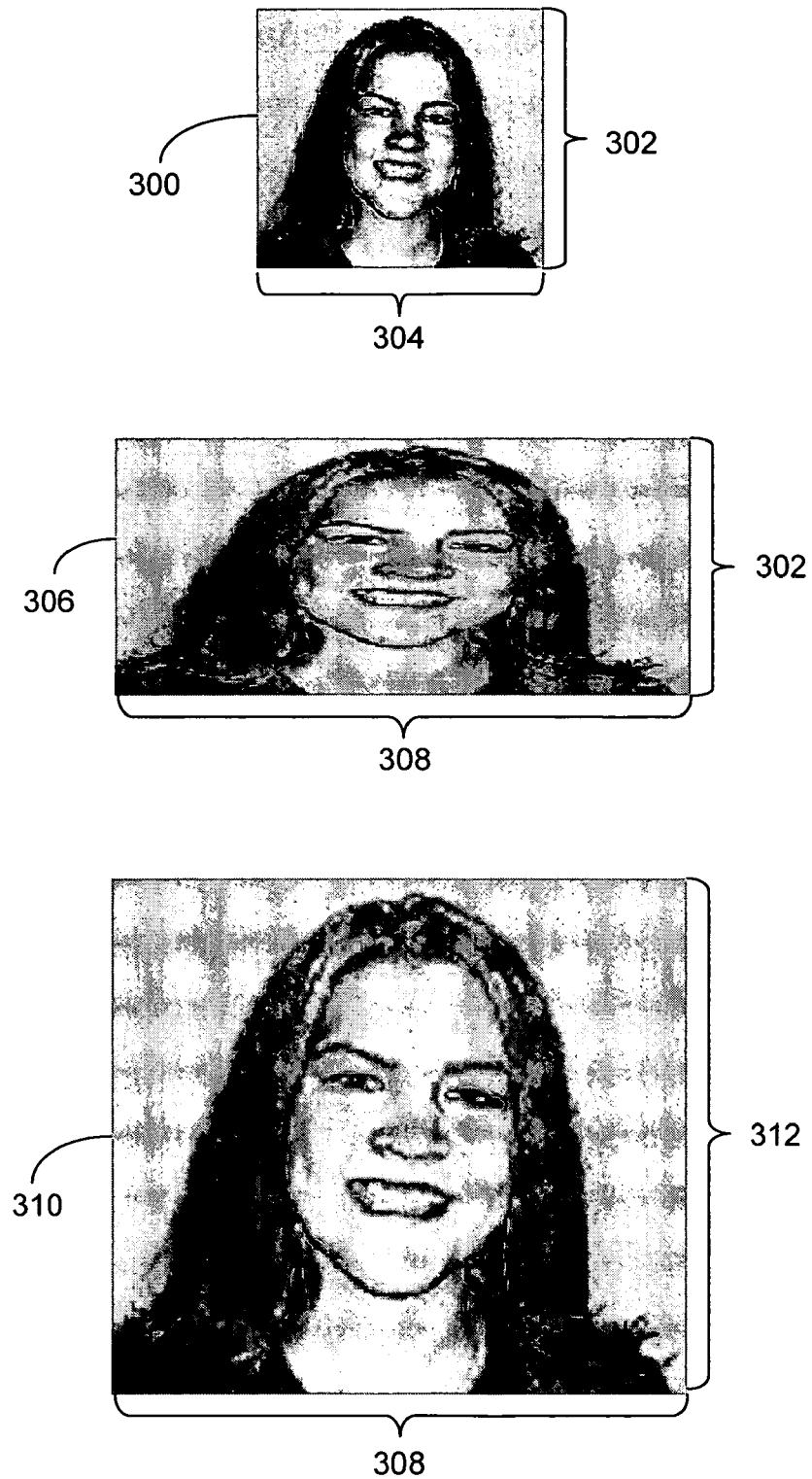
FIGS. 3A and 3B illustrate outputs from one-dimensional transformations of an image in accordance with one embodiment of the present invention.
Figure 3B:
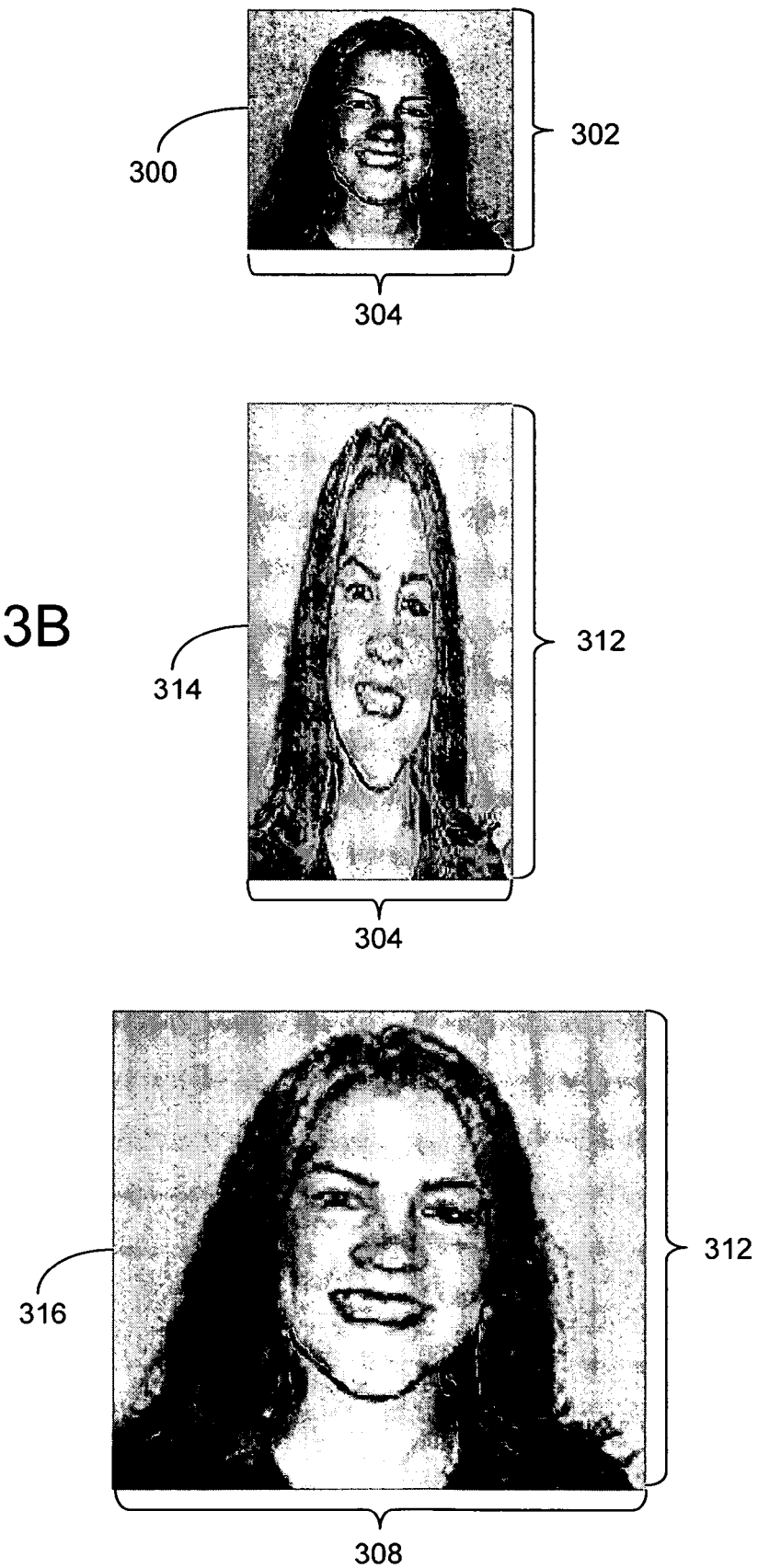

FIGS. 3A-3B present the transformation of an image 300 by a series of one-dimensional transformations. As previously discussed, one-dimensional transformations may be used to alter the visual appearance of an image. Turning to FIG. 3A, the image 300 has a height 302 and a length 304. A request to resize the image may be received. Specifically, the request may ask that both the height 302 and the length 304 be doubled. To comply with this request, a complex retexturing algorithm may be selected. In order for a pixel shader of a GPU to perform this algorithm, it must be decomposed into two elementary, one-dimensional transformations. An image 306 displays the results of a first one-dimensional transformation. The image 306 has a length 308, which is double its original length. However, the image 306 maintains its original height. Accordingly, a one-dimensional transformation has increased the length of the image 306, while leaving the height unchanged. An image 310 demonstrates the output of the second pass of the decomposed algorithm. The height of image 310, a height 312, is now double its previous value. Accordingly, the image 310 has double the height and width of the image 300 in compliance with the resizing request.

FIG. 3B also depicts the performance of two one-dimensional transformations to double the height and width of the image 300. The first pass of the re-texturing algorithm yields an image 314. The image 314 has a height 312 that is double the height 302 of the image 300. The second pass yields an image 316. The second pass has doubled the length of the image 316 to a length 308. It should be noted that the image 316 has double the height and width of the image 300 and that the image 316 is identical to the image 310 of FIG. 3A. As demonstrated by FIGS. 3A and 3B, a complete retexturing operation may be completed by separately performing one-dimensional transformations with respect to a digital image. While FIGS. 3A and 3B present one example of an image transformation with multiple passes, those skilled in the art will appreciate that multi-pass decomposition can be applied to many different kinds of transformations. Further exemplary transformations include affines and perspectives transformations such as rotation, translation, shearing, scaling and symmetry transformations.

Figure 4:
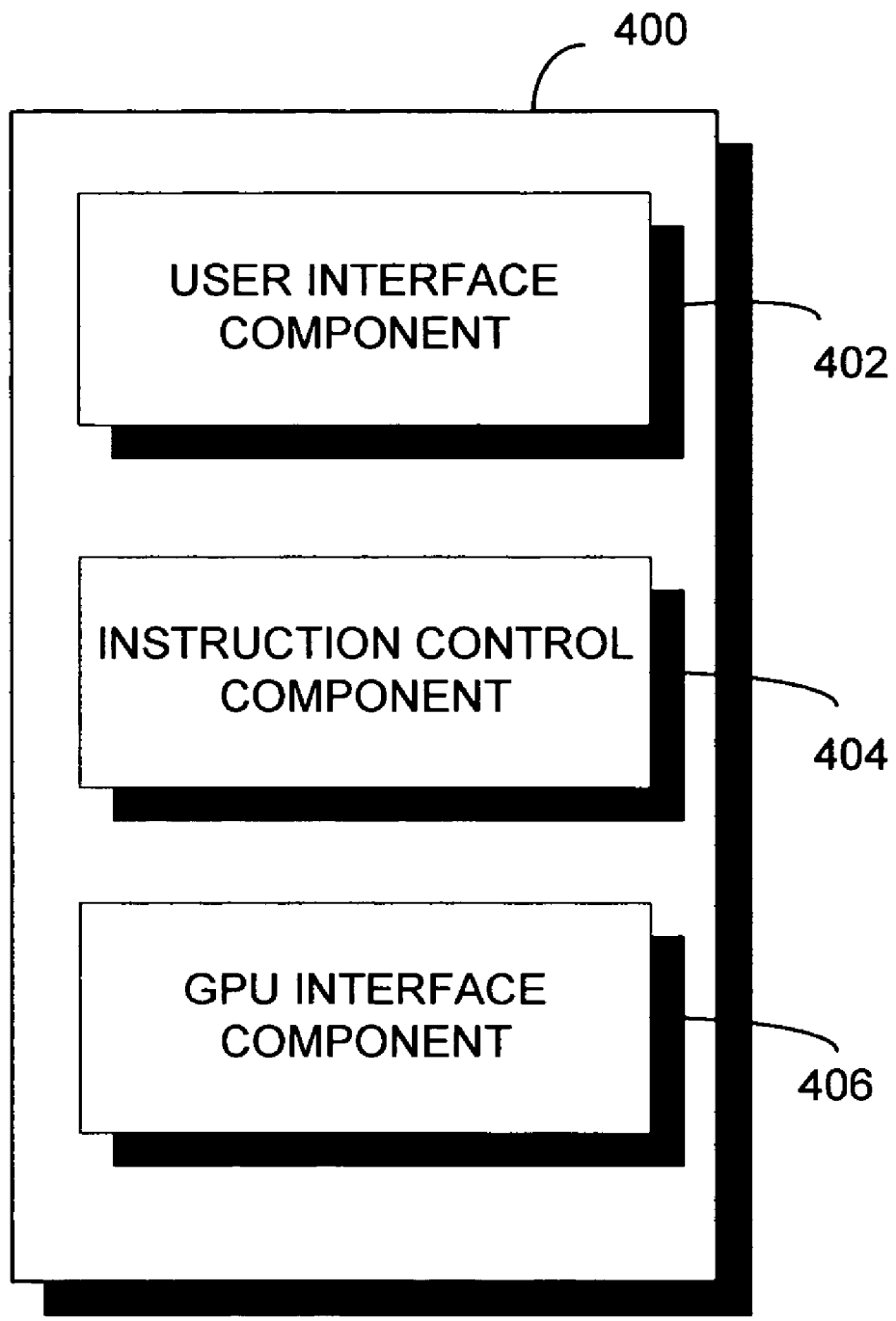
FIG. 4 is a schematic diagram illustrating a system for altering the visual appearance of a digital image in accordance with one embodiment of the present invention.

FIG. 4 illustrates a system 400 for altering the appearance of a digital image. The system 400 includes a user interface component 402. The user interface component may be configured to receive a request to transform the appearance of a digital image. The request may be received via any number of interfaces and may relate to any number of transformations. For example, the request may be generated automatically by a computer program. The request may also be receive via user inputs. In one embodiment, the user is provided a set of controls in a user interface. By interacting with these controls, the user may indicate desired alterations to the digital image.

The system 400 further includes an instruction control component 404. The instruction control component 404 may be configured to generate sets of instructions, and each set may define a one-dimensional transformation. For example, a resampling algorithm may be selected in response to a received request. In order to implement this algorithm with a GPU, the algorithm may be decomposed into one-dimensional transformations by the instruction control component 404. For a 2-D image, the instruction control component 404 may generate two sets of instructions. The first set of instructions may utilize horizontal scanline, while the second set may utilize vertical scanline. For a 3-D image, the instruction control component 404 may generate a third set of instructions that utilizes scanlines parallel to the z-axis.

A GPU interface component 406 is also included in the system 400. The GPU interface component 406 may be configured to communicate each of the sets of instructions to a GPU. For example, a GPU may include a programmable pixel shader capable of executing the sets of instructions. The GPU interface component 406 may communicate a set of instructions to the GPU. The GPU interface component 406 may also enable the GPU to generate an output image from the performance of the communicated instructions. This output image may be subsequently altered as additional sets of instructions are communicated by the GPU interface component 406. Once each of the sets of instructions has been executed by the GPU, the output image may represent the requested transformation of the digital image.

Figure 5:
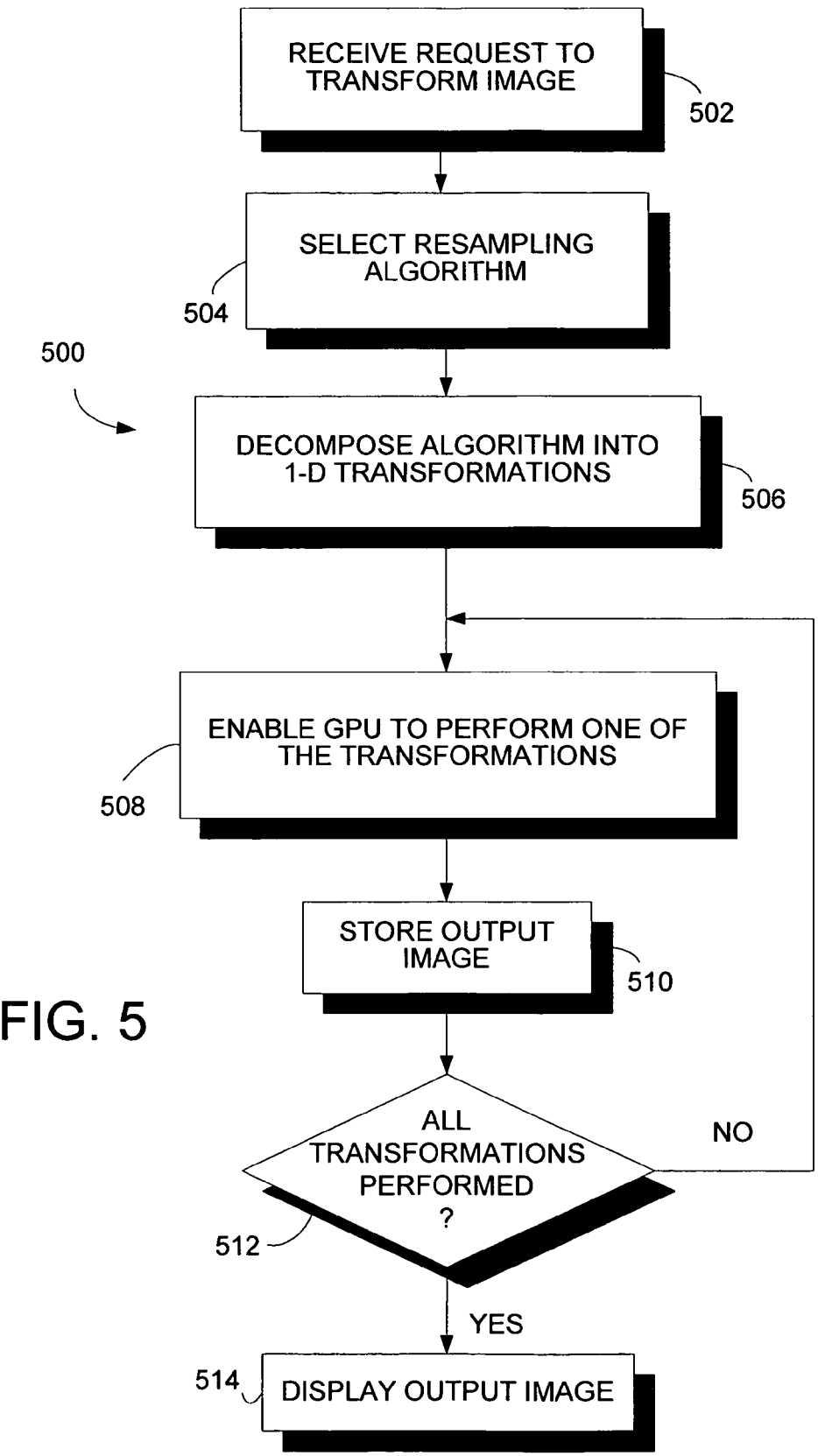
FIG. 5 illustrates a method in accordance with one embodiment of the present invention for implementing resampling algorithms on a processing device.

FIG. 5 illustrates a method 500 for implementing resampling algorithms on a processing device. The method 500, at 502, receives a request to transform a digital image. For example, the request may seek to resize an image, rotate an image or apply a geometric transformation. At 504, the method 500 selects a texture resampling algorithm to be performed with respect to at least a portion of a digital image. As will be appreciated by those skilled in the art, a variety of resampling algorithms exist in the art, and numerous algorithms may be acceptable for altering a digital image.

At 506, the method 500 decomposes the selected texture resampling algorithm into two or more one-dimensional transformations. Techniques for decomposing texture resampling algorithms are known in the art. In general, to decompose an algorithm, it is divided into two or more one-dimensional transformations. By performing each of the transformations in separate passes, the completed algorithm may be achieved. In one embodiment, the method 500 expresses each of the one-dimensional transformations as a set of executable instructions. These instructions, for example, may be carried out by a programmable pixel shader in a GPU.

The method 500, at 508, enables a GPU to perform one of the transformations. In one embodiment, the method 500 communicates to the GPU instructions that define the transformation. Then, a pixel shader may generate an output image by implementing these instructions. The method 500 stores the output image at 510. In one embodiment, the output image is stored in a temporary texture buffer until each of the transformations has been performed.

At 512, the method 500 determines whether all of the transformations have been performed. If there remain transformations that have not been performed, the method 500 repeats 508 and 510. For example, if there are three transformations, the method 500 may perform 508 and 510 three separate times. The output image is updated after each pass such that, upon the conclusion of the final transformation, the output image complies with the request received at 502. Those skilled in the art will appreciate that, by decomposing the texture resampling algorithm, the resulting instructions/code may be much more suitable for execution by a GPU. After each transformation has been applied to the digital image, the output image is displayed at 514. Any number of presentation techniques may be acceptable for this display.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. One or more computer-readable media having computer-useable instructions embodied thereon to perform a method for transforming a visual appearance of a digital image with a graphics processing unit (GPU), said method comprising:

receiving a request to transform the appearance of at least a portion of said digital image, wherein said request is input by a user into a user interface that includes a set of controls allowing user selection of a plurality of image transformations;

identifying a texture resampling algorithm in response to said request;

representing said texture resampling algorithm with a first set of instructions and a second set of instructions;

communicating to a programmable pixel shader in said GPU said first set of instructions for performing a first one-dimensional transformation with respect to said digital image, wherein results from performing said first one-dimensional transformation are stored as a first output image, wherein said programmable pixel shader includes memory for storing said first set of instructions;

after said first one-dimensional transformation is performed, communicating to said programmable pixel shader said second set of instructions for performing a second one-dimensional transformation with respect to said first out image, wherein results from performing said second one-dimensional transformation are stored as a second output image for presentation.

2. The media of claim 1, wherein said GPU includes a programmable pixel shader.

3. The media of claim 1, wherein said second output image includes a transformation of said digital image in accordance with said request.

4. The media of claim 1, wherein said method further comprises presenting said second output image to the user.

5. The media of claim 1, wherein said first one-dimensional transformation and said second one-dimensional transformation utilize sampling points extending along one or more horizontal scanlines or extending along one or more vertical scanlines.

6. A system for transforming a visual appearance of a digital image with a graphics processing unit (GPU), said system comprising:

an instruction control component configured to identify a texture resampling algorithm in response to a request to transform the appearance of at least a portion of said digital image, wherein said instruction control component is further configured to represent said texture resampling algorithm with at least two sets of instructions, wherein said at least two sets of instructions includes a first set of instructions that provides a first one-dimensional transformation and a second set of instructions that provides a second one-dimensional transformation; and a GPU interface component configured to communicate said at least two sets of instructions to at least one GPU and further configured to enable said at least one GPU to generate an output image in accordance with said request by separately executing said at least two sets of instructions, wherein said second set of instructions is communicated to said at least one GPU after execution of said first set of instructions is complete.

7. The system of claim 6, further comprising a user interface component configured to receive said request.

8. The system of claim 7, wherein said user interface component is configured to present said output image to a user.

9. The system of claim 6, wherein said digital image is a three dimensional image.

10. The system of claim 9, wherein said at least two sets of instructions includes a third set of instructions that provide a third one-dimensional transformation.

11. The system of claim 10, wherein said first one-dimensional transformation utilizes horizontal scanlines, said second one-dimensional transformation utilizes vertical scanlines and said third one-dimensional transformation utilizes scanlines parallel to the z-axis.

12. The system of claim 6, wherein said at least two sets of instructions represent at least a portion of a decomposed texture resampling algorithm.

13. One or more computer-readable media having computer-useable instructions embodied thereon to perform a method for implementing resampling algorithms on a processing device, said method comprising:

identifying a texture resampling algorithm to be performed with respect to at least a portion of a digital image;

representing said resampling algorithm with at least two sets of instructions, wherein said at least two sets of instructions includes a first set of instructions that provides a first one-dimensional transformation and a second set of instructions that provides a second one-dimensional transformation;

communicating said first set of instructions to a programmable pixel shader and enabling said programmable pixel shader to perform said first one-dimensional transformation with respect to said digital image, wherein results of said first one-dimensional transformation are placed in a first output image, wherein said programmable pixel shader includes memory for storing instructions, and wherein said communicating said first set of instructions includes storing said first set of instructions in said memory; and after performing said first one-dimensional transformation, communicating said second set of instructions to said programmable pixel shader and enabling said programmable pixel shader to perform said second one-dimensional transformation with respect to said first output image, wherein said communicating said second set of instructions includes replacing said first set of instructions in said memory with said second set of instructions.

14. The media of claim 13, wherein said texture resampling algorithm cannot be performed on said processing device in a single pass.

15. The media of claim 13, wherein said processing device is a dedicated graphics processor having at least one pixel shader.

16. The media of claim 13, wherein said method further comprises displaying results of said second one-dimensional transformation to a user.

17. The media of claim 13, wherein said digital image is a three-dimensional image, and wherein said at least two sets of instructions includes a third set of instructions that provides a third one-dimensional transformation.

\* \* \* \* \*

UNITED STATES PATENT AND TRADEMARK OFFICE
CERTIFICATE OF CORRECTION

PATENT NO.      : 7,656,412 B2
APPLICATION NO. : 11/316093
DATED           : February 2, 2010
INVENTOR(S)     : Demandolx et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 524 days.

Signed and Sealed this

Thirtieth Day of November, 2010

David J. Kappos
*Director of the United States Patent and Trademark Office*